United States Patent [19]
Wills

[11] Patent Number: 6,011,779
[45] Date of Patent: Jan. 4, 2000

[54] ATM SWITCH QUEUING SYSTEM

[75] Inventor: Jeffrey M. Wills, Fairfax, Va.

[73] Assignee: Hyundai Electronics America, San Jose, Calif.

[21] Appl. No.: 08/777,438

[22] Filed: Dec. 30, 1996

[51] Int. Cl.[7] ..................................................... H04J 3/14
[52] U.S. Cl. .......................... 370/236; 370/395; 370/468; 370/236; 370/231; 370/413
[58] Field of Search ..................... 370/390, 414, 370/395, 397, 235, 468, 236, 231, 418, 413

[56] References Cited

U.S. PATENT DOCUMENTS 5,570,348  10/1996  Holden ..................................... 370/414
5,774,453  6/1998  Fukano et al. ........................... 370/231

*Primary Examiner*—Brian Zimmerman
*Assistant Examiner*—William H. Wilson, Jr.
*Attorney, Agent, or Firm*—Townsend and Townsend and Crew LLP

[57] ABSTRACT

An ATM switch with a switch queuing system which minimizes cell loss for bursty traffic, while avoiding delay for time-critical. The switch has a plurality of input ports and a plurality of output ports, a switch fabric transmitting cells from the input ports to the output ports, and a backpressure signal circuit connected between each output buffer of each output port and each input buffer of each input port. Each input port has an input buffer holding ATM cells when the cells arrive faster from the port's input channel than the input port can transmit. The input port transmits cells from its input buffer responsive to a plurality of priority levels. Each output port has an output buffer holding cells when the cells arrive faster from the input ports than the output port can transmit. The output port also transmits cells from its output buffer responsive to a plurality of priority levels. The backpressure signal circuit sends a signal from a congested output buffer through the switch fabric to those input port buffers which had immediately transmitted a cell to the output buffer so that the input port buffers cease transmission. In this manner, the ATM switch drops cells on a per-connection basis, rather than on cell priority level.

16 Claims, 4 Drawing Sheets

ATM SWITCH QUEUING SYSTEM

BACKGROUND OF THE INVENTION

This invention relates to telecommunication networks and, in particular, to switches in an asynchronous transfer mode (ATM) network.

In a telecommunication network, units of data must be routed between different points of the network through switches. In ATM networks, traffic streams of mixed types of information are carried according to the concept of "bandwidth on demand." The data units, ATM cells, are transferred in accordance with the varying requirements of each ATM cell. Data units which are time-critical are given priority in network routing. Data units which are information-critical are given priority against cell loss. This ability to handle video, voice, computer data and other information has led to the wide acceptance of ATM as a prospective network standard.

An ATM network switch must route information reliably with minimum delay and loss, but the wide variation in requirements in ATM networks creates heavy demands upon the ATM switch. Different designs have been proposed and implemented. Manifest shortcomings have included complexity, high cost, and impediments to configuration changes. In many designs the switch is created from complex components which centralize switch operations. Not only are the components expensive, but switch configuration changes are difficult because the centralized operations must also be changed to accommodate the new switch configuration. A far better design is to rely upon modularity by which components can easily be added to, or removed from, the switch.

The present invention solves or substantially mitigates these problems with an ATM switch in which buffering is expeditiously distributed with a backpressure system which maximizes the speedy transmission of time-critical data and minimizes the loss of information-critical data. The ATM switch is modular in construction and fairly low cost components may be used.

SUMMARY OF THE INVENTION

The present invention provides for an ATM switch for transferring cells from a plurality of input channels to a plurality of output channels. The switch has a plurality of input ports, a plurality of output ports, a switch fabric transmitting cells from the input ports to the output ports, and a backpressure signal circuit connected between each output buffer of each output port and each input buffer of each input port. Each input port is connected to one of the input channels and transmits cells from the input channel. Each output port is connected to one of the output channels and transmits cells to the output channel. Each input port has an input buffer holding ATM cells when the cells arrive faster from the port's input channel than the input port can transmit. The input port transmits cells from its input buffer responsive to a plurality of priority levels. The output port has an output buffer holding cells when the cells arrive faster from the input ports than the output port can transmit. The output port also transmits cells from its output buffer responsive to a plurality of priority levels. The backpressure signal circuit sends a signal from an congested output buffer through the switch fabric to those input port buffers which had immediately transmitted a cell to the output buffer so that the input port buffers cease transmission.

In this switch queuing system cell loss is minimized for bursty traffic, while delay for time-critical data is avoided. The ATM switch drops cells on a per-connection basis, rather than on cell priority level. The sender(s) of the congestion-causing data is penalized, rather than the other users of the ATM switch.

BRIEF DESCRIPTION OF THE DRAWINGS

The invention may be better understood by reference to the following detailed description in connection with the accompanying drawings.

DETAILED DESCRIPTION OF SPECIFIC EMBODIMENTS

Figure 1:
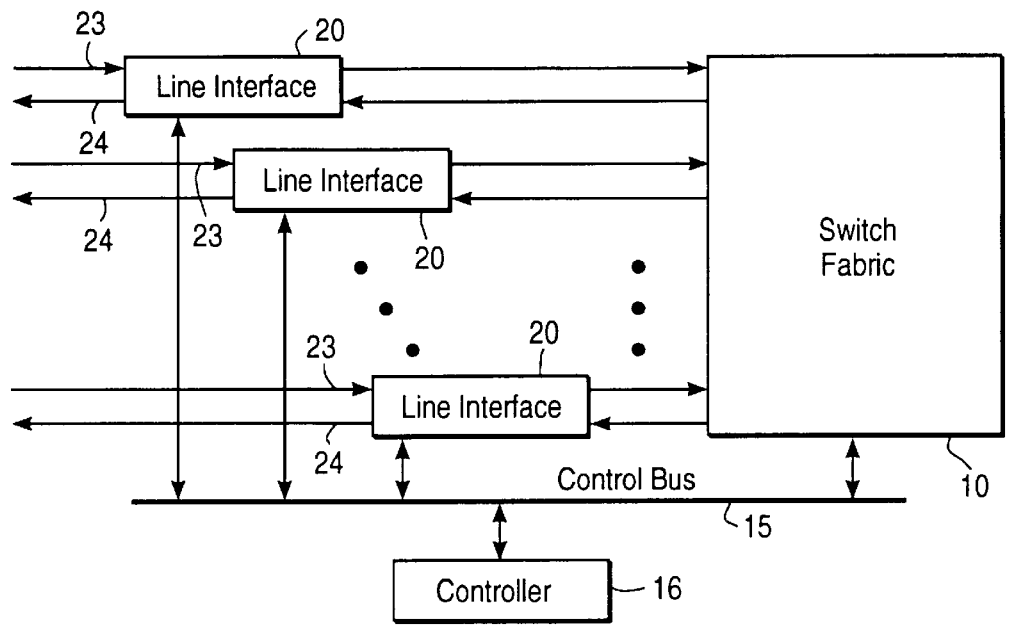
FIG. 1 is a block diagram of the general organization of an ATM switch according to an embodiment of the present invention.

The general organization of an ATM switch according to the present invention is illustrated in FIG. 1. Each input channel is connected to an input port 23, which has an input buffer 21 (not shown in this drawing). Each output channel is connected to an output port 23, which has an output buffer 22 (not shown in this drawing). The input buffers 21 and output buffers 22 are connected by a switch fabric 10 by which the ATM cells received through an input port 23 (and input buffer 21) are routed to the proper output port 24 (and output buffer 22). The input and output ports 23 and 24 (and input and output buffers 21 and 22) are realized in line interface modules 20 which are interconnected by the switch fabric 10. The ATM cells enter through a line interface module 20, route through the switch fabric 10, and exit through another module 20.

The ATM switch also has a controller unit 16 which communicates with the modules 20 and switch fabric 10 through a control bus 15. The controller unit 16 configures and monitors the line interface modules 20 and the switch fabric 10. The controller unit 16 provides all call access control functions, including call setup, maintenance, and teardown, and processes the information measured by the line interface modules 20 to maintain connection and link statistics for network management. Operationally, signaling and management cells are transmitted to and from the controller unit 16. These cells are received by the unit 16 after they pass through the switch fabric 19 to an output module 20. The signaling and management cells are removed from the output module 20 and sent to the controller unit 16 through the control bus 15. The controller unit 16 transmits signaling and management cells to the network by sending these cells to an input module 20 by the bus 15. The cells are routed through the fabric 10 to an output module 20 and transmitted to the network.

By passing such control information for the controller unit 16 through the switch fabric 10 first before the information reaches the controller unit 16, or before the information generated by the controller unit 16 leaves the switch, multiple controller units 16 can each monitor a fixed number of line interface modules 20 with call control and network management messages passed through a central processor when the switch architecture is expanded to a larger number of ports. This modularity in control and network management design allows ready expansion of the ATM switch. Control and management processing capacity, i.e., the control units 16, is added with more switching capacity, i.e., the line interface modules 20.

The line interface modules 20 support all the by-line and by-connection functions, including physical layer link termination, translation of ATM cell header information into routing tags for use by the fabric 10, traffic policing, cell rate decoupling, including the insertion and deletion of unassigned cells. Each module 20 also measures cell loss, cells tagged, cells passed and the number of cells dropped for each connection. On the other hand, the switch fabric 10, which routes cells received from an module 20 to one or more modules 20, only maintains queue-level statistics on congestion by the measurement of the number of cells during which backpressure (described below) is applied, and the amount of cell loss.

Each line interface module 20 has one input ports 23 and one output port 24 with each input buffer 21 connected to a communication line on which ATM cells are received. Each output buffer 22 of an output port 24 is connected to a communication line to which the cells are transmitted.

Figure 2:
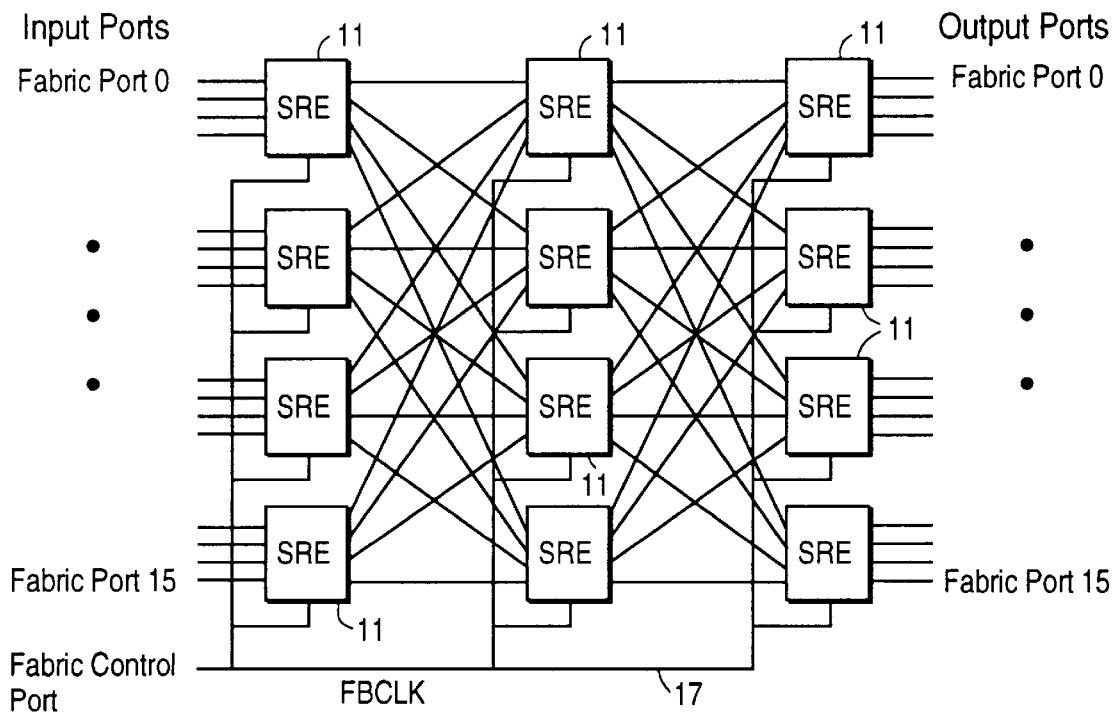
FIG. 2 is a block diagram of the switch fabric of the ATM switch of FIG. 1.

The organization of the switch fabric 10 is detailed in FIG. 2. The fabric 10 is a 16-port buffered Benes interconnection network with 4×4 switch routing elements 11. That is, each switch routing element 11 has 4 input ports and 4 output ports. As shown in FIG. 2, the leftmost column of elements 11 are each connected to an output port of a line interface module 20. The four output ports of each of these elements 11 are, in turn, connected to input ports of the middle column of elements 11. The output ports of the middle column of elements 11 are connected to the input ports of the rightmost column of switch routing elements 11. The output ports of these elements are connected to the output ports of the line interface modules 20.

An element 11 routes each individual ATM cell from one of its input ports to the proper output port(s) by the bits within the routing tag of the cell. A fabric control bus 17, which is directly connected to the control bus 15, allows the controller unit 16 to program the elements 11 and to read their status. A fabric base clock (FBCLK) signal sets the rate at which the cells are acted upon by the elements 11 for transfer through the switch fabric 10 from element 11 to element 11. This determines the internal link rate of the fabric 10.

Figure 3:
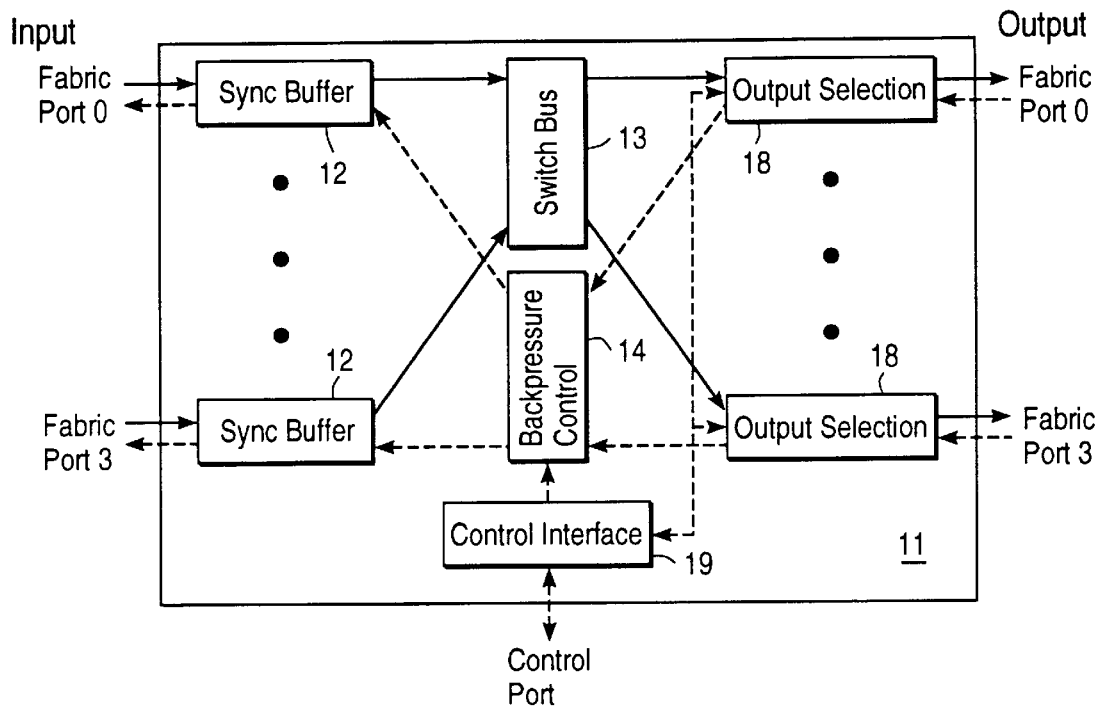
FIG. 3 is a block diagram of the elements of a switch routing element of the switch fabric of FIG. 2.

The elements of each switching routing element 11, a fully 4×4 non-blocking element, is shown in FIG. 3. Each element 11 has four sync buffers 12, each connected to an output port of a line interface module 20 or of another switch routing element 11. The sync buffers 12 are connected to switch bus 13, which is in turn connected to four output selection blocks 18. Each output selection block 18 is capable of holding 32 cells, while a sync buffer can hold 2 cells. Hence each switch routing element 11 can hold up to 136 cells at a time. To handle congestion problems, the switch routing element 14 has a backpressure control block 14 which can receive backpressure signals from each one of the output selection blocks 18 and pass on the backpressure signals to each one of the sync buffers 12, as described below. A control interface block 19 handles control and signaling functions for the element 11 through a control port which is connected to the control fabric bus 17.

Figure 4:
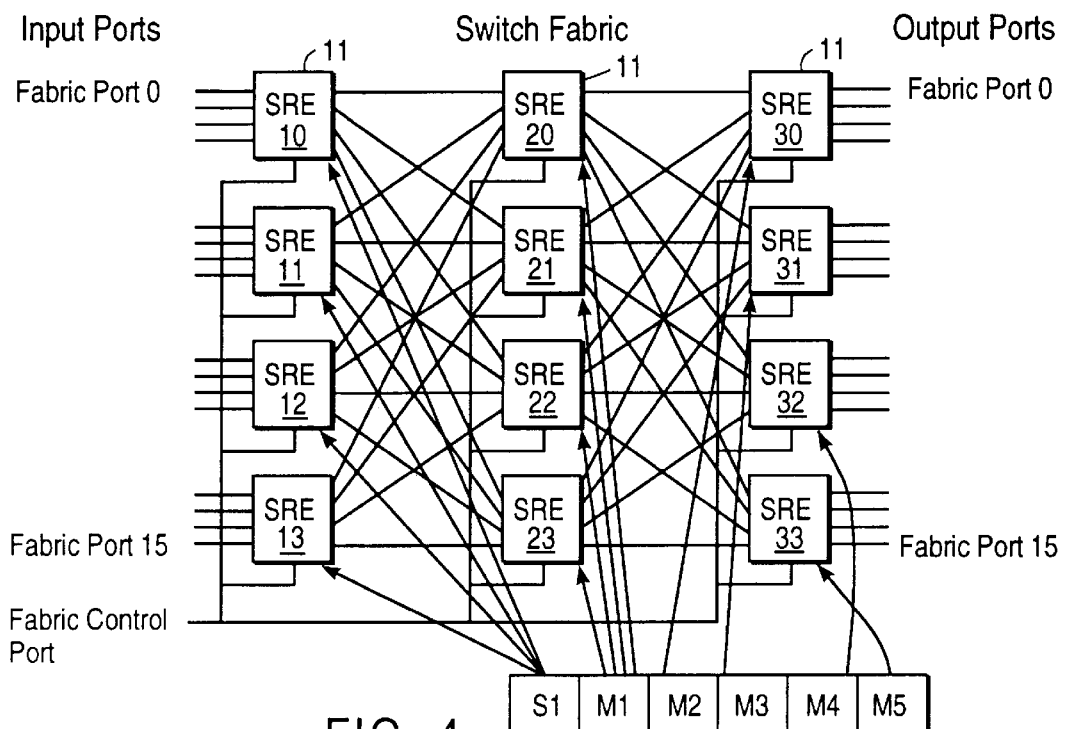
FIG. 4 illustrates the mapping of switch routing elements to the routing tag field in a cell header.

Cells are clocked into a sync buffer 12 at the rate the cells are transmitted into the element 11. The cells from the four sync buffers 12 are multiplexed through the switch bus 13. The output selection blocks 18 read the routing tags for each cell, and route the cells towards their respective output ports. Each output selection block 18 reads either a multicast routing field ('M' field) or unicast routing field ('S' field) in the cell header. The mapping of switch routing element to the routing tag field is shown in FIG. 4.

The first stage of the switch routing elements 11 in the switch fabric 10 are all programmed to read the S field. These switch routing elements 11 can use the same routing tag field, as the cells which pass through them all come from different sources. Furthermore, the value of the S field uniquely determines to which second stage switch routing elements 11 the cell will go. The cells are routed to the switching element output as described in the table below.

| S field value | Output Port |
|---|---|
| 0 | 0 |
| 1 | 1 |
| 2 | 2 |
| 3 | 3 |

A cell with the value '1' in the S field is routed to port 1 by a switch routing element 11 in the first stage. This cell travels to the switch routing element '21', regardless of which switch routing element routed the cell in that direction.

The second stage of switch routing elements 11 also use the same field. However, these switch routing elements 11 must be capable of routing the cells to multiple switch routing elements 11 in the third stage so that these switch routing elements are programmed to read an M (or multicast) field in the routing tag, i.e., the field M1 in the routing tag illustrated in FIG. 4.

In an M field, a value of '1' in each individual bit of the field indicates to the output selection block 18 that the cell is destined for its output port. The mapping is as shown below:

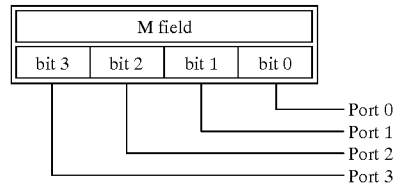

Thus if a cell with the bit pattern, '1011' in the M1 field, arrives at a switching element 11 in the second stage of the fabric 10, the output selection block 18 for ports '0', '1', and '3' copy the cell from the switching bus into the buffer within the output selection block 18. The copies of the cell are eventually transmitted through the output ports '0', '1' and '3' to the switching elements '30', '31' and '33' in the third, and last, stage of the switch fabric 10.

The switch routing elements 11 in the third stage of the switch fabric 10 route cells directly to the outputs of the switch fabric 10 itself. For multicasting capability, these switching elements 11 are programmed to use the 'M' (multicast) fields in the routing tags of the cell headers. Furthermore, it is desirable to be able to route the cells to any combinations of the output ports. Since each of the last stage switching elements 11 are only connected to four of the switch fabric output ports, each of the third stage switching elements 11 must have a distinct 'M' field in the routing stage. Thus the switching elements '30', '31' '32', and '33' are programmed to read fields 'M2', 'M3', 'M4', and 'M5', respectively. The operation of these fields is exactly the same as for the 'M1' field.

Figure 5A:
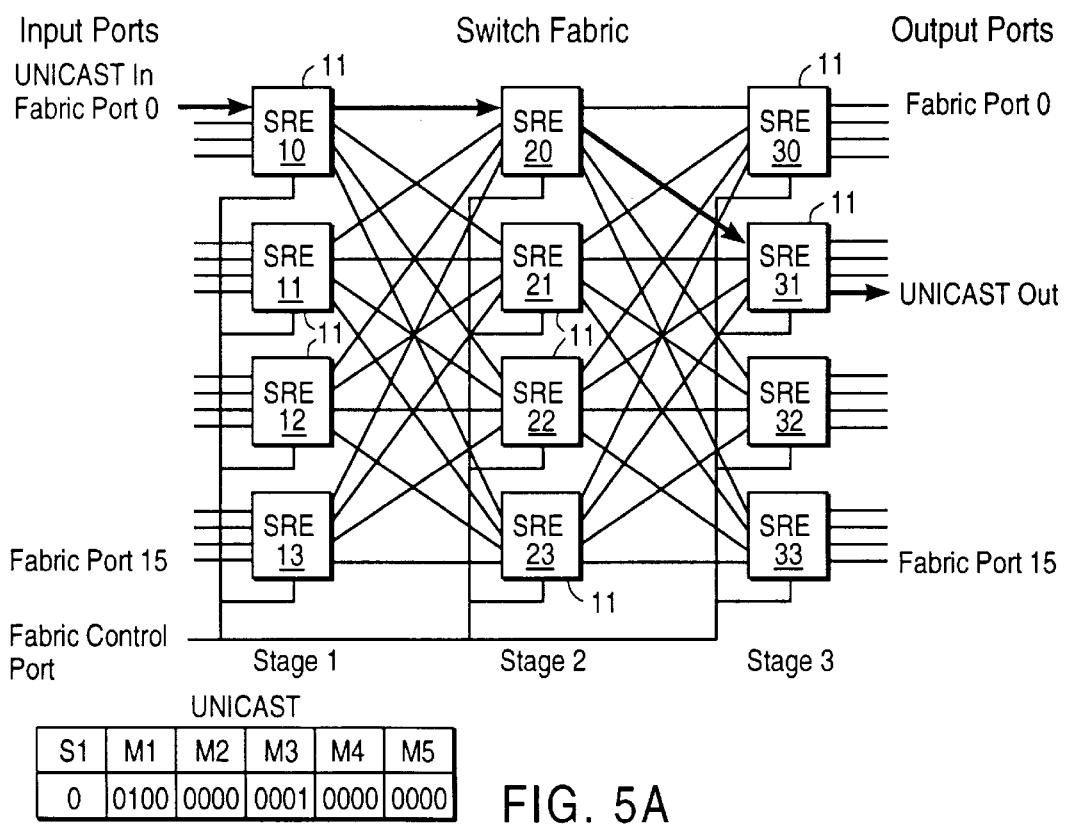
FIG. 5A illustrates a routing path through the switch fabric for an exemplary unicast connection.
Figure 5B:
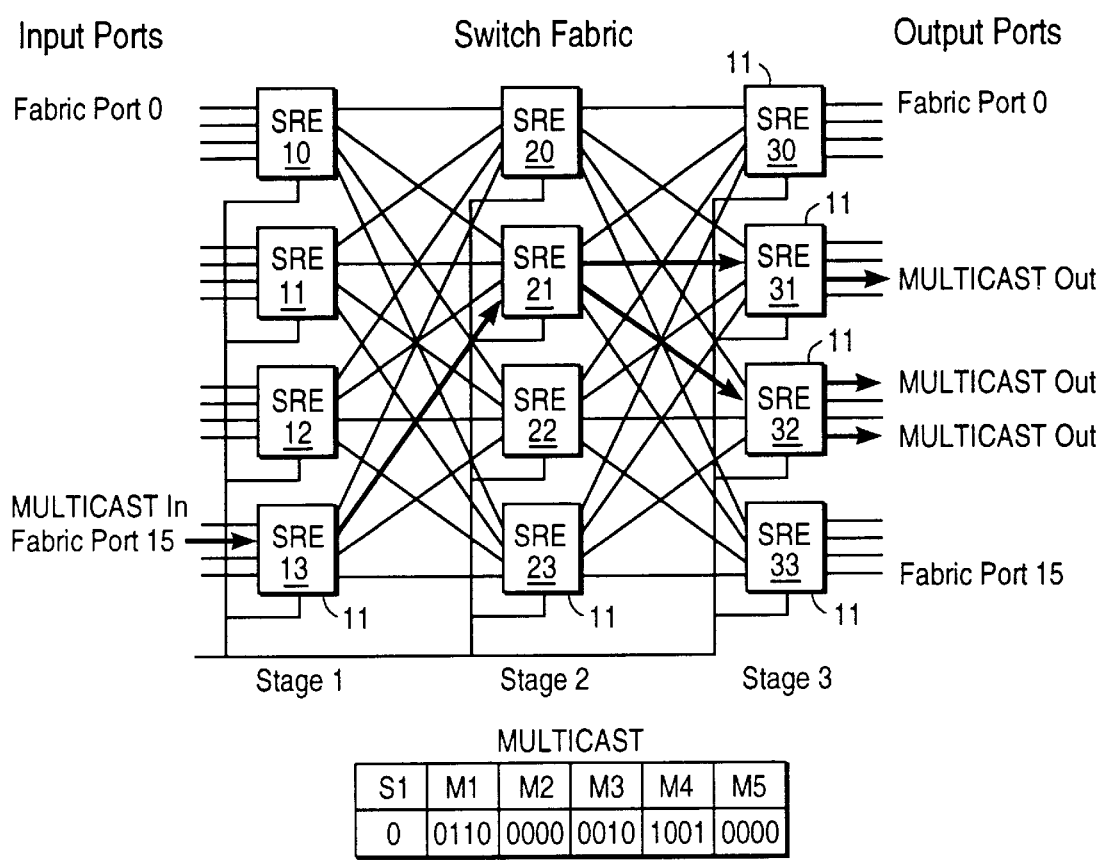
FIG. 5B illustrates a routing path through the switch fabric for an exemplary multicast connection.

FIGS. 5A and 5B illustrate the routing path through the switch fabric 10 for a unicast connection, and for a multicast connection, respectively, for exemplary routing tags. The darkened lines between the switch routing elements 11 of the various stages illustrate the routing of the cell.

For an optimal cell queuing system which facilitates the transport of cells through the ATM switch and avoids the loss of cells as much as possible, the ATM switch has a large amount of buffering capability which is distributed in an optimal manner between the line interface modules 20 (in the form of the input and output buffers 21 and 22) and the switch fabric 10. Each input buffer 21 has a buffering capacity for holding 7000 cells of the module 20 and each output buffer 22 the capacity for 2000 cells. While each of the switch routing elements 11 can hold only 32 cells, the small buffering in the switch fabric 10 allows cells to continue to move through the switch fabric 10 when there is contention between cells for the same output port. The large buffering in the modules 20 operate when there is congestion caused by bursts of cells from different connections headed for the same destination, i.e., the same port.

The input buffers 21 and the output buffers 22 of the line interface modules 20 have two levels of priority. Each input buffer 21 operates as two buffers, a high-priority buffer 25 and a low-priority buffer 27. Likewise, each output buffer operates as two buffers, a high-priority buffer 26 and a low-priority buffer 28, responsive to a priority bit in the header of each ATM cell. Time-critical ATM cells are routed through the high-priority buffers 25 and 26. Cells in these high-priority buffers 25, 26 travel in preference to the cells in the low priority buffers 27, 28. The result is that time-critical cells travel through the modules 20 with a smaller delay than loss-critical cells during heavy loads of low-priority traffic. On the other hand, in the switch fabric 10 the ATM cells, whether from time-critical or delay-insensitive connections, share the same buffering. Travel through the switch fabric 10 is not prioritized, since the buffer sizes in the switch fabric 10 are so small that the delay is negligible. This prioritization sets the urgency by which ATM cells are queued and transported through the ATM switch. For example, the high priority is used for time-critical data, such as constant bit rate (CBR) and network management information. The high priority path provides a fast path for data to avoid traffic.

For cooperation between the buffers in the line interface modules 20 and the switch routing elements 11, a backpressure signal circuit is used. The backpressure circuit avoids the loss of cells in transmission when the destination buffer of the cells has overfilled so that it can no longer store more cells. The backpressure signal, an Overfill signal, is applied by a destination buffer to any source, either a line interface module 20 or a switch routing element 11 which attempts to send a cell to the buffer which has become congested, i.e., filled past a predetermined threshold. Source sending cells to non-congested buffers are not stopped.

Figure 6:
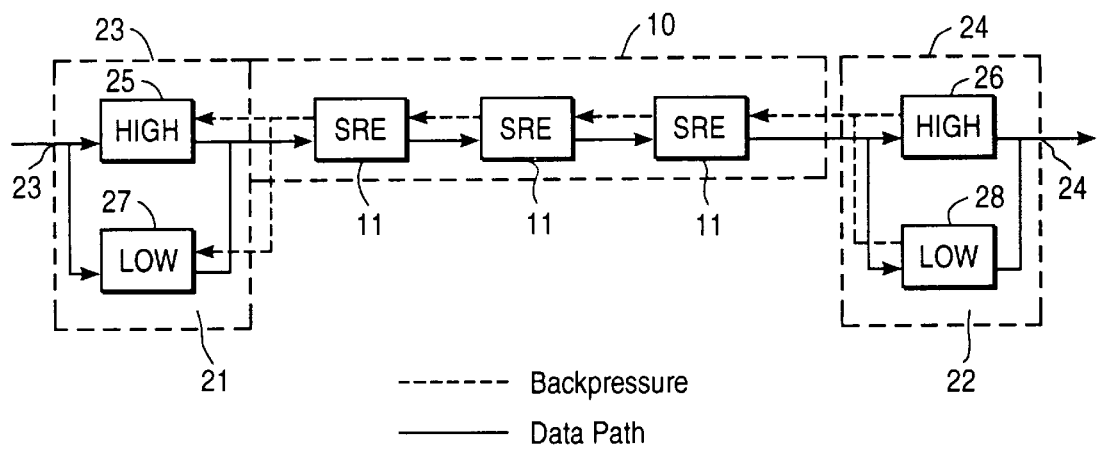
FIG. 6 illustrates the cell path through an input buffer, stages of the switch fabric, and output buffer, with backpressure signal connections, of the ATM switch of FIG. 1.

FIG. 6 illustrates the path of an incoming cell from an input channel to an input buffer 23, through the three stages of switch routing elements 11 in the switch fabric 10, and an output buffer 24 connected to an output channel. The cell data path is indicated by solid lines. Parallel to the data connections for transferring cells through the ATM switch, there is a backpressure signal connection for each buffer to send an Overfill signal back to a cell source. This Overfill signal path is indicated by dotted lines.

Each output buffer 24 can issue an Overfill signal to the four connected switch routing elements 11 in the third stage of the switch fabric 10. Each of the third stage elements 11 can issue an Overfill signal to the four connected switch routing elements 11 in the second stage, while each second stage element 11 can issue an Overfill signal to the four connected switch routing elements 11 in the first stage. Each first stage element 11 can issue an Overfill signal to the output buffers 23 of the four connected input ports 23. The Overfill signal is directed by the congested destination buffer back to the particular source which sent the cell. The Overfill signal disables off the transmission capability of the source; transmission can resume when the destination buffer has transmitted its congested cells and enables the transmission capability of the disabled sources.

In the switch routing elements 11 of the switch fabric 10, the output selection block 18 sends an Overfill signal to the backpressure control block 14 if its buffer of the block 18 fills beyond a threshold. Upon receiving the backpressure signal, the backpressure control block 14 routes the signal to one (or more) sync buffers 12 which attempt to send cells to the congested output selection block 18. The cell is not read from the sync buffer 12 and the cells in the sync buffer 12 remains there until the next time that input port is selected. The status of the buffer of the output selection block 18 is checked again. The process is repeated until the buffer has room for the cell.

Of course, when an Overfill signal is removed and a buffer can resume transmission, it is the cells in the high-priority buffers 25 and 26 which are transmitted first in the case of cells stored in the input and output buffers 21 and 22.

In most applications the switch is effectively output-queued in that if the instantaneous bandwidth of multiple connections en route to the same output port exceeds the output line rate, the output buffer 22 of the line interface module 20 begins to fill. When that buffer 22 has filled, a backpressure signal is sent to the previous switch element 11 in the switch fabric 10. The switching elements 11 propagate the backpressure signal back towards the source if their buffers fill up. Finally the input buffer 21 of the module 20 receives a backpressure signal so that it begins to fill. The current sizing of the buffers 21 and 22 enables the switch to handle bursts of data up to 5 milliseconds (at 622 Mbps), which is very useful in carrying data traffic between file servers and clients, or between nodes in a distributed computing environment.

The switch queuing system minimizes cell loss for bursty traffic, while avoiding delay for time-critical data. The switch drops cells on a per-connection basis, rather than on cell priority level. The sender(s) of the congestion-causing data is penalized, rather than the other users of the ATM switch.

While the above is a complete description of the preferred embodiments of the invention, various alternatives, modifications and equivalents may be used. It should be evident that the present invention is equally applicable by making appropriate modifications to the embodiments described above. For example, the number of priority levels could be expanded beyond two with appropriate modifications to the ATM switch and the ATM cell header. Therefore, the above description should not be taken as limiting the scope of the invention which is defined by the metes and bounds of the appended claims.

What is claimed is:

1. An ATM switch for transferring cells from a plurality of input channels to a plurality of output channels, said switch comprising a plurality of input ports, each input port connected to one of said input channels and transmitting cells from said one input channel, said input port having an input buffer holding cells when said cells arrive faster from said input channel than said input port transmits, said input port transmitting cells from its input buffer responsive to a plurality of priority levels;

a plurality of output ports, each output port connected to one of said output channels and transmitting cells to said one output channel, said output port having an output buffer holding cells when said cells arrive faster from said input ports than said output port transmits, said output port transmitting cells from its output buffer responsive to a plurality of priority levels;

a switch fabric transmitting cells from said input ports to said output port, said switch fabric having buffers for holding said cells, said buffers non-responsive to said levels of priority; and a backpressure signal circuit connected between each output buffer of each output port and each input buffer of each input port, said backpressure signal circuit network sending a signal from a congested output buffer to those input port buffers which had immediately transmitted a cell to said output buffer so that said input port buffers cease transmission.

2. The ATM switch of claim 1 wherein said plurality of priority levels do not exceed two.

3. The ATM switch of claim 1 wherein said switch fabric comprises buffers for holding said cells, said input and output buffers have a capacity exceeding said switch fabric buffer capacity by at least an order of magnitude.

4. The ATM switch of claim 1 wherein each input buffer has a capacity more than twice that of an output buffer.

5. The ATM switch of claim 4 wherein each input buffer has a capacity of approximately 7000 cells.

6. The ATM switch of claim 5 wherein each output buffer has a capacity of approximately 2000 cells.

7. An ATM switch for transferring cells from a plurality of input channels to a plurality of output channel, said switch comprising a plurality of input ports, each input port connected to one of said input channels and transmitting cells from said one input channel, said input port having an input buffer holding cells when said cells arrive faster from said input channel than said input port transmits, said input port transmitting cells from its input buffer responsive to a plurality of priority levels;

a plurality of output ports, each output port connected to one of said output channels and transmitting cells to said one output channel, said output port having an output buffer holding cells when said cells arrive faster from said input ports than said output port transmits, said output port transmitting cells from its output buffer responsive to a plurality of priority levels;

a switch fabric transmitting cells from said input ports to said output ports, said switch fabric having buffers for holding said cells; and a backpressure signal circuit connected between each output buffer of each output port and each input buffer of each input port through said switch fabric, said backpressure signal circuit network sending a signal from a congested output buffer to those input port buffers which had immediately transmitted a cell to said output buffer so that said input port buffers cease transmission, said switch fabric buffers unresponsive to any level of priority in said backpressure signal.

8. The ATM switch of claim 7 wherein said switch fabric is non-responsive to said levels of priority.

9. The ATM switch of claim 7 wherein said plurality of priority levels do not exceed two.

10. The ATM switch of claim 7 wherein said switch fabric comprises buffers for holding said cells, said input and output buffers have a capacity exceeding said switch fabric buffer capacity by at least an order of magnitude.

11. The ATM switch of claim 7 wherein each input buffer has a capacity more than twice that of an output buffer.

12. An ATM switch for transferring cells from a plurality of input channels to a plurality of output channel, said switch comprising a plurality of input ports, each input port connected to one of said input channels and transmitting cells from said one input channel, said input port having an input buffer holding cells when said cells arrive faster from said input channel than said input port transmits, said input port transmitting cells from its input buffer responsive to a plurality of priority levels;

a plurality of output ports, each output port connected to one of said output channels and transmitting cells to said one output channel, said output port having an output buffer holding cells when said cells arrive faster from said input ports than said output port transmits, said output port transmitting cells from its output buffer responsive to a plurality of priority levels;

a switch fabric transmitting cells from said input ports to said output ports, said switch fabric having a plurality of interconnected switch elements, each switch element having a plurality of input terminals, a plurality of output terminals and a switch bus, each input terminal having an input buffer holding cells received by said input terminal, each output terminal having an output buffer holding cells to be transmitted by said output terminal, and said switch bus transmitting cells from said input terminals to said output terminals; and a backpressure signal circuit connected between each output buffer of each output port and each input buffer of each input port, said backpressure signal circuit network sending a signal from a congested output buffer to those input port buffers which had immediately transmitted a cell to said output buffer so that said input port buffers cease transmission.

13. The ATM switch of claim 12 wherein said input terminal buffers and said output terminal buffers of said plurality of switch elements are non-responsive to said levels of priority.

14. The ATM switch of claim 12 wherein said plurality of priority levels do not exceed two.

15. The ATM switch of claim 12 wherein said input and output buffers of said input and output ports have a capacity exceeding said switch fabric buffer capacity by at least an order of magnitude.

16. The ATM switch of claim 12 wherein each input buffer of an input port has a capacity more than twice that of an output buffer of an output port.

* * * * *